July 25, 1961 J. W. WALLEY 2,994,033
MAGNETIC CRACK-DETECTING DEVICES
Filed Dec. 18, 1957
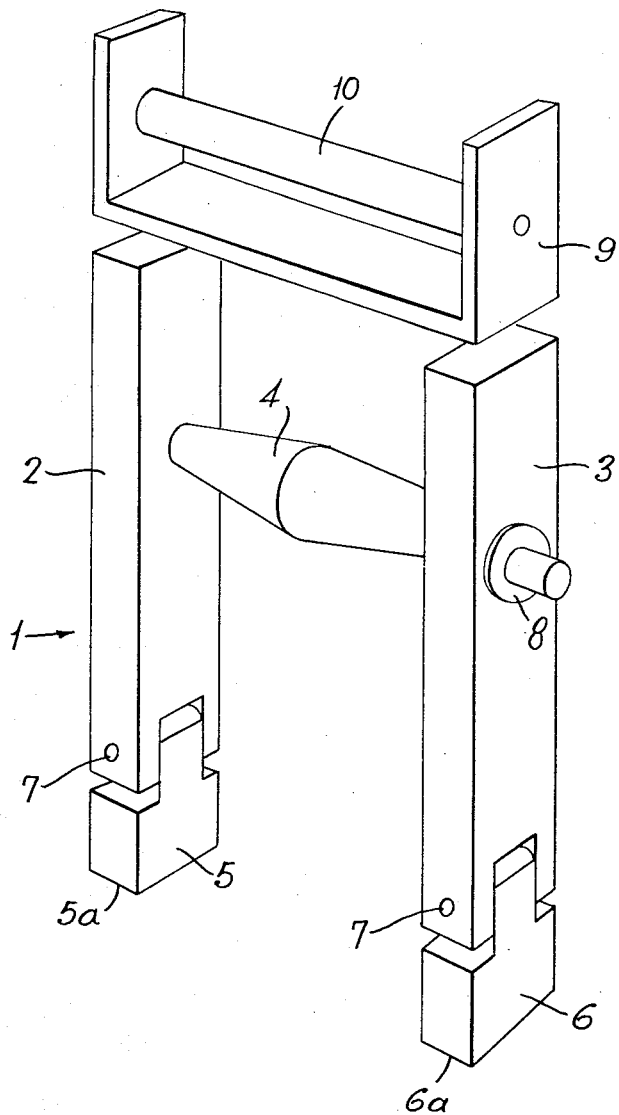
INVENTOR
James William Walley
By Morris & Bateman
ATTORNEYS

2,994,033
MAGNETIC CRACK-DETECTING DEVICES
James William Walley, Prestwich, Manchester, England, assignor to Metropolitan-Vickers Electrical Company Limited, London, England, a British company
Filed Dec. 18, 1957, Ser. No. 703,611
Claims priority, application Great Britain Jan. 8, 1957
1 Claim. (Cl. 324—38)

This invention relates to magnetic devices for detecting surface cracks on ferrous metal parts.

It is well known to detect a surface crack on a ferrous metal part by magnetising the part and applying evenly over its surface a magnetic powder or a suspension thereof. The presence of a crack inclined to the direction of magnetisation in the magnetised part gives rise to a surface field distortion localised at the position of the crack and indicated by the accumulation of the magnetic powder at the edges of the crack. Optimum field distortion will be obtained when the direction of the magnetic field is such that it crosses the crack at right-angles and it follows, therefore, that in testing for transverse cracks in elongated ferrous metal parts the parts should be magnetised longitudinally.

According to one known arrangement, transverse cracks have been detected by clamping the part lengthwise between the opposite poles of an electromagnet so as to magnetise the part longitudinally. Such an arrangement has generally required an electric mains supply and suitable control gear to protect the electromagnet windings, and whereas it is suitable for use in a fixed installation, such as a factory, it is less suited for use in, say, a mobile workshop unit for effecting tests in situ.

In accordance with the present invention a magnetic device for detecting cracks in a ferrous metal part comprises a pair of spaced magnetic members having preferably hinged end portions providing surfaces adapted to be magnetically bridged by said ferrous metal part, a permanent magnet linking said members and inducing opposite poles at said surfaces for the magnetisation of said ferrous metal part, and a readily movable magnetic shunt member that bridges or is adapted to bridge said spaced magnetic members for materially reducing the magnetisation of said ferrous metal part.

At least one of the magnetic members is preferably movable with respect to the other magnetic member to facilitate the testing of ferrous metal parts having curved or stepped surfaces.

In testing for surface cracks in a ferrous metal test part the magnetic shunt member, which conveniently serves as a "keeper" for the device during idle periods, will be detached from the spaced magnetic members which are so arranged that their pole surfaces are magnetically bridged by the test part. Magnetic powder or a suspension thereof such as an iron oxide suspended in paraffin is then applied evenly over the magnetised test part between the pole surfaces, the presence of cracks inclined to the direction of magnetisation of the test part being indicated by the accumulation of the magnetic powder at the edges of the cracks due to local magnetic fields established across these cracks.

On completion of the test the magnetic shunt member will be re-applied so that it bridges the spaced magnetic members so as to provide a low reluctance path across the permanent magnet the effect of which is to reduce the magneto-motive force available for the magnetisation of the ferrous metal test part. The consequent reduction in both the magnetisation of the test part and the force of magnetic attraction between that part and the pole surfaces enables the device readily to be lifted free of the test part.

Reference will now be made by way of example to the accompanying drawing which shows in perspective a crack-detecting magnetic device according to the invention.

Referring to the drawing, there is shown a crack detecting magnetic device comprising an H-shaped magnetic structure 1 having its side limbs constituted by spaced magnetic members 2 and 3 and its cross or bridging limb formed by a strong permanent magnet 4 which conveniently comprises a pair of frusto-conical parts, such as of Alcomax III, secured together endwise as illustrated in the drawing. The magnetic members 2 and 3 are provided with end portions 5 and 6, respectively, which have plane surfaces 5a and 6a adapted to be bridged by a ferrous metal part under test and which are hinged by means of pins 7 for movement about axes normal to the plane of the structure 1, the hinging of the portions 5 and 6 being such that relatively large areas of these portions make good magnetic contact with the remaining parts of the respective magnetic members. The magnetic member 2 is fixedly secured to one end of the permanent magnet 4 but to provide for relative movement between the members 2 and 3, enabling irregularly surfaced ferrous metal parts to be tested for cracks, the member 3 is rotatably mounted on the other end of the permanent magnet 4. A friction disc 8 is preferably interposed between the member 3 and the permanent magnet 4 to guard against accidental movement of the member 4 once a setting has been effected. The permanent magnet 4 induces opposite poles at the surfaces 5a and 6a so that when these surfaces are in contact with a ferrous metal part under test the part becomes magnetised between surfaces 5a and 6a.

As a result of strong magnetic attraction between the structure 1 and the test part difficulty may be experienced in separating them after completion of the test. This difficulty is overcome by the provision of a low reluctance magnetic shunt member comprising a U-shaped member 9, of mild steel for example, adapted to bridge the upper ends of the magnetic members 2 and 3 and provided with a handle 10 extending between its side limbs. By arranging this magnetic shunt member so that it bridges the upper ends of the magnetic members 2 and 3 upon completion of a test on a ferrous metal part a low reluctance path is provided across the permanent magnet 4 so that there is a reduction in magneto-motive force available for the magnetisation of the test part as a result of the increased magnetic flux in the internal reluctance of the permanent magnet 4. This reduction in magneto-motive force materially reduces the magnetisation of the test part and the device can then be readily lifted free of the test part.

It will be seen from the drawing that relative movement between the two members 2 and 3 will inevitably reduce the area of contact between the shunt member and the upper ends of the members 2 and 3 but sufficient contact to produce the desired magnetic shunting effect just above described will normally be obtainable.

What I claim is:

A magnetic device for detecting cracks in ferrous metal parts comprising two spaced magnetic members having hinged end portions providing a pair of surfaces adapted to be magnetically bridged by a ferrous metal part under investigation, a permanent magnet linking said spaced members and inducing opposite magnetic poles at said surfaces for the magnetisation of said ferrous metal part, at least one of said magnetic members being movable about the axis of said permanent magnet and the hinged end portions being movable about axes extending transversely of the magnet axis, and a magnetic shunt member capable of bridging said spaced magnetic members for materially reducing the magnetisation of said ferrous metal part and readily detachable from the rest of the device.

References Cited in the file of this patent

UNITED STATES PATENTS

| | | |
|---|---|---|
| 2,117,132 | Baermann | May 10, 1938 |
| 2,225,179 | Oglevee | Dec. 17, 1940 |
| 2,832,922 | De Forest | Apr. 29, 1958 |

FOREIGN PATENTS

| | | |
|---|---|---|
| 562,530 | Great Britain | July 5, 1944 |